(12) United States Patent
Uemura et al.

(10) Patent No.: US 6,429,564 B1
(45) Date of Patent: Aug. 6, 2002

(54) MAGNETO GENERATOR

(75) Inventors: Fumito Uemura; Shinji Baba; Yoshihide Masumoto; Tomokazu Umezaki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/799,111

(22) Filed: Mar. 6, 2001

(30) Foreign Application Priority Data

Sep. 20, 2000 (JP) ........................................ 2000-285074

(51) Int. Cl.[7] .............................................. H02K 21/22
(52) U.S. Cl. .................................. 310/153; 123/149 D
(58) Field of Search ....................... 310/153; 123/149 D

(56) References Cited

U.S. PATENT DOCUMENTS

| | | | | |
|---|---|---|---|---|
| 3,828,212 A | * | 8/1974 | Harkness et al. | 310/153 |
| 4,182,027 A | * | 1/1980 | Benezech | 156/297 |
| 4,306,167 A | * | 12/1981 | Tomite et al. | 310/153 |
| 4,550,697 A | * | 11/1985 | Campen | 123/149 D |
| 4,701,654 A | * | 10/1987 | Tatukawa et al. | 310/153 |
| 4,710,659 A | * | 12/1987 | Takano et al. | 310/153 |
| 4,980,592 A | * | 12/1990 | Olmr et al. | 123/149 D |
| 5,015,901 A | * | 5/1991 | Phelon et al. | 123/149 D |
| 5,179,872 A | * | 1/1993 | Pernice | 310/153 |
| 5,600,195 A | * | 2/1997 | Welborn et al. | 123/149 D |
| 5,962,942 A | * | 10/1999 | Pullen et al. | 310/156.37 |
| 6,023,828 A | * | 2/2000 | Iwata et al. | 29/259 |

FOREIGN PATENT DOCUMENTS

| | | | | |
|---|---|---|---|---|
| JP | 58194695 A | * | 11/1983 | ........... B63H/21/26 |
| JP | 4-121380 | | 10/1992 | ........... H02K/21/22 |
| JP | 10331634 A | * | 12/1998 | ........... B63H/21/00 |

* cited by examiner

Primary Examiner—Joseph Waks
(74) Attorney, Agent, or Firm—Sughrue Mion, PLLC

(57) ABSTRACT

Ventilation efficiency inside a flywheel is improved. Plural vent holes 16 are formed on a side wall portion of a flywheel 11 formed by a circumferential wall portion and the side wall portion on one end side of the circumferential wall portion, and fins 17 protruding toward inside of the flywheel 11 are formed between the neighboring vent holes 16. The fins 17 are formed integrally at the time of filling with a resin 14 with which a space between a guard ring 13 for guarding plural magnets 12 arranged inside the circumferential wall portion of the flywheel 11 and the flywheel 11 is filled, and the magnets 12 are embedded in the resin 14. In generating electric power, the fins 17 rotate synchronously with the flywheel 11, a negative pressure is generated at the vent hole 16 portions, and outside air is introduced into the flywheel 11 and ventilation is performed.

8 Claims, 4 Drawing Sheets

MAGNETO GENERATOR

BACKGROUND OF THE INVENTION

1. Technical Field

The present invention relates to a magneto generator for generating an electric power utilizing electromagnetic induction between magnets and armature winding by rotating a flywheel.

2. Background Art

FIGS. 11 and 12 show a rotor of a conventional flywheel-type magneto generator disclosed in the Japanese Utility Model Publication (unexamined) No. 121380/1992. FIG. 11 is a sectional view taken along the line XI—XI of FIG. 12, and FIG. 12 is a sectional view taken along the line XII—XII of FIG. 11. Reference numeral 1 is a bowl-shaped flywheel formed by a circumferential wall portion and a side wall portion on one end side of the circumferential wall portion. Numeral 2 is a magnet, and plural magnets 2 are arranged in the circumferential direction on the circumferential wall portion of the flywheel 1 so as to be engaged with projections 1a arranged on the inside of the circumferential wall portion. Numeral 3 is a cylindrical guard ring formed by drawing a metal plate and having flange portions 3a formed at one end by bending, and this guard ring 3 is in close contact with the inside the magnets 2 arranged annularly. Numeral 4 is a resin with which both side portions of the magnets 2 and spaces between end portions of the respective magnets 2 are filled to fix the magnets 2 and the guard ring 3 integrally onto the flywheel 1. Numeral 5 is a boss portion mounted on a rotary shaft (not shown in the drawings) fixed to the center of the side wall portion of the flywheel 1. Numeral 4a is fins 4a arranged on the inside wall portion of the flywheel. Another end side of the circumferential wall portion of the flywheel 1 is an opening side freely open. Numeral 1b shows step portions 1b formed by extrusion molding on the inside of the circumferential wall portion at several places in the whole circumference of the flywheel 1.

Next, operation of the conventional rotator is hereinafter described. The boss portion 5 mounted on the rotary shaft (not shown) and the flywheel 1 are rotated by rotation of the rotary shaft. Accordingly, the fins 4a arranged on the inside wall portion of the flywheel 1 stir air between a magneto coil and the side wall of the flywheel 1 and cool the magneto coil.

In the rotor of the above conventional magneto generator, it is certain that air in the flywheel is stirred, but ventilation inside the flywheel is not sufficient. On the other hand, the armature winding serving as the magneto coil generates a heat in proportion to square of the generated current. As described above, since ventilation is insufficient, it is difficult to change the heated air, and this causes a problem that rise in resistance value due to temperature rise of the winding cannot be sufficiently controlled and the generated current is lowered.

SUMMARY OF THE INVENTION

The present invention was made to resolve the above-discussed problems and has an object of obtaining a magneto generator in which ventilation inside a flywheel is efficiently performed to prevent temperature rise of an armature winding serving as a magneto coil, and a generated current is prevented from lowering.

A magneto generator according to the invention comprises: a bowl-shaped flywheel formed by a circumferential wall portion and a side wall portion on one end side of the circumferential wall portion; plural magnets arranged on an inner peripheral surface of the mentioned flywheel; and a magneto coil which is arranged in the mentioned flywheel so as to oppose to the mentioned magnets and generates an electric power utilizing electromagnetic induction between the mentioned magneto coil and the mentioned magnets; in which the mentioned flywheel has plural vent holes on the side wall portion and is provided with fins arranged between neighboring two vent holes and protruding toward the inside of the flywheel so that outside air may be introduced in the flywheel or inside air may be discharged therefrom during rotation of the flywheel.

As a result, during rotation of the flywheel, air is effectively introduced from outside of the flywheel through the vent holes or air in the flywheel is effectively discharged to outside through the vent holes, whereby it is possible to improve power generation efficiency.

Another magneto generator according to the invention comprises: a bowl-shaped flywheel formed by a circumferential wall portion and a side wall portion on one end side of the circumferential wall portion; plural magnets arranged on an inner peripheral surface of the mentioned flywheel; and a magneto coil which is arranged in the mentioned flywheel so as to oppose to the mentioned magnets and generates an electric power utilizing electromagnetic induction between the mentioned magneto coil and the mentioned magnets; in which the flywheel has plural vent holes on the side wall portion and fins are formed so as to surround circumference and inside of the vent holes so that outside air may be introduced in the flywheel or inside air may be discharged therefrom through holes formed on the fins.

As a result, during rotation of the flywheel, air is effectively introduced from outside of the flywheel through the vent holes or air in the flywheel is effectively discharged to the outside through the vent holes, whereby it is possible to improve power generation efficiency.

In the magneto generator according to the invention, it is preferable that the fins are formed integrally by a resin, the mentioned resin filling a space between a cylindrical guard ring arranged on the inside of the magnets and the flywheel, and the magnets are embedded in the resin.

As a result, any separate process is not necessary to form the fins, and it is possible to manufacture the magneto generator at a reasonable cost.

In the magneto generator according to the invention, it is preferable that the holes formed on the fins surrounding the inside of the vent holes are open so that center axis of each hole may be inclined with respect to the rotational direction of the flywheel.

In the magneto generator according to the invention, it is preferable that the holes formed on the fins surrounding the inside of the vent holes are open so that backside portions in the rotational direction of the flywheel may be inclined with respect to the rotational direction.

In the magneto generator according to the invention, it is preferable that the fins surrounding the circumferences of the vent holes are arranged so that backside portion of the flywheel in the rotational direction may protrude toward inside or outside of the flywheel.

As a result, it is possible to introduce the outside air and discharge the heated air in the flywheel to outside more effectively.

DESCRIPTION OF THE PREFERRED EMBODIMENTS

Embodiment 1

Figure 1:
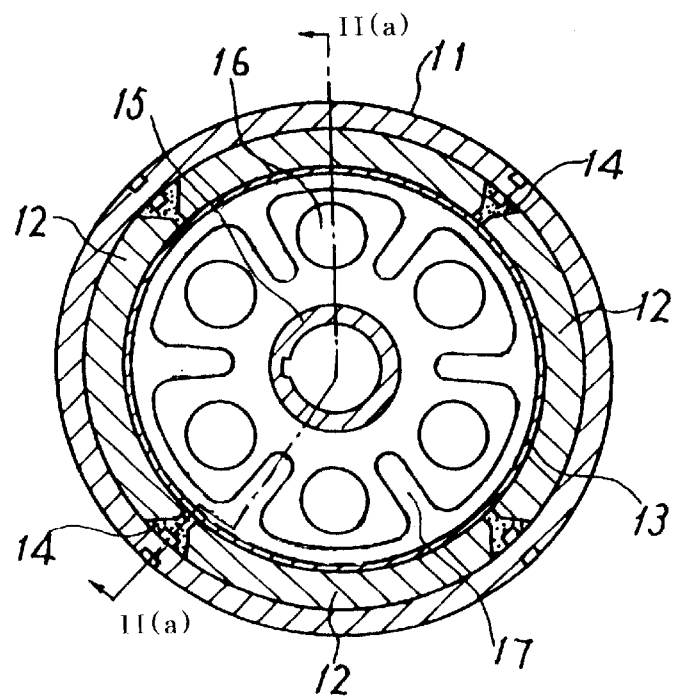
FIG. 1 shows a magneto generator according to Embodiment 1 of the invention, and is a sectional view taken along the line I— I of FIG. 2(a).
Figure 2A:
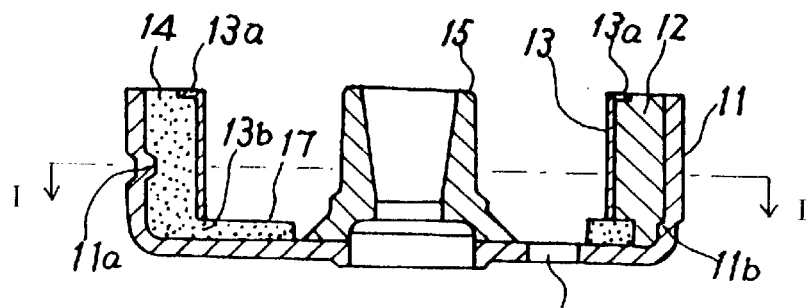
FIG. 2(a) is a sectional view taken along the line II(a)—II(a) of FIG. 1.
Figure 2B:
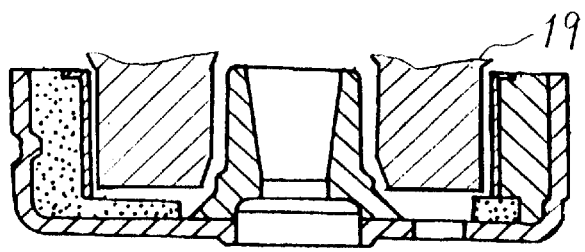
FIG. 2(b) is another sectional view showing a magneto coil.

A magneto generator according to Embodiment 1 of the invention is hereinafter described with reference to FIGS. 1 and 2. FIGS. 1 and 2 show a magneto generator according to Embodiment 1 of the invention. A magneto coil is omitted in FIG. 2(a), while FIG. 2(b) shows the magneto coil. FIG. 1 is a sectional view taken along the line I—I of FIG. 2(a), and FIG. 2(a) is a sectional view taken along the line II(a)—II(a) of FIG. 1. A rotor in this Embodiment 1 is provided with a bowl-shaped flywheel 11 formed by a circumferential wall portion and a side wall portion on one end side of the circumferential wall portion. A boss portion 15 for mounting the rotor on a rotary shaft (not shown) such as crankshaft of an internal combustion engine is attached to the center of the side wall portion of the flywheel 11. Projections 11a are formed on an inner peripheral surface of the circumferential wall portion of the flywheel 11 and, for example, four long narrow circular arc-shaped magnets 12 are arranged in the circumferential direction of the circumferential wall portion so as to engage with the projections 11a, and they are located at predetermined positions in the axial direction by a guard ring 13. Numeral 11b shows step portions 11b are formed by extrusion molding on the inside of the circumferential wall portion at several places in the whole circumference of the flywheel 11. Numeral 19 is a magneto coil, i.e., a stator held on the stationary side, and this stator 19 is arranged inside the guard ring 13 so as to oppose to the surrounding magnets 12 to generate an electric power due to electromagnetic induction between the stator 19 and the magnets 12.

The guard ring 13, being in close contact with the inner peripheral surface of the circumferential wall portion of the flywheel 11 and having flange portions 13a to hold the respective magnets 12 arranged in the circumferential direction, is shaped into a cylinder having the flange portions 13a and is arranged to be in close contact with the inside of the magnets 12. The space between the guard ring 13 and the circumferential wall portion of the flywheel 11 is filled with a resin 14 so that spaces between the magnets 12 and both side portions of the magnets 12 are filled with the resin 14, thereby embedding the magnets 12. Plural vent holes 16 are formed on the side wall portion of the flywheel 11, and fins 17 for flowing air are formed of a resin between neighboring two vent holes 16. By these fins 17, when rotating the flywheel 11, a negative pressure is generated at the vent hole 16 portions and the outside air is forcibly introduced into the inside of the flywheel 11.

Notches 13b are formed on a side of the guard ring 13, being in contact with the side wall portion of the flywheel 11, and configuration of the fins is preliminarily formed on a mold for resin molding (not shown). In this manner, when filling with the resin 14, the resin 14 flows from the notches 13b into mold portions forming the configuration of the fins, and the fins 17 protruding inwardly from the side wall portion of the flywheel 11 are formed at the same time. As a result, any separate process is not necessary to form the fins in the manufacturing process of the rotor, and it is possible to manufacture the magneto generator at a reasonable cost.

Embodiment 2

Figure 3:
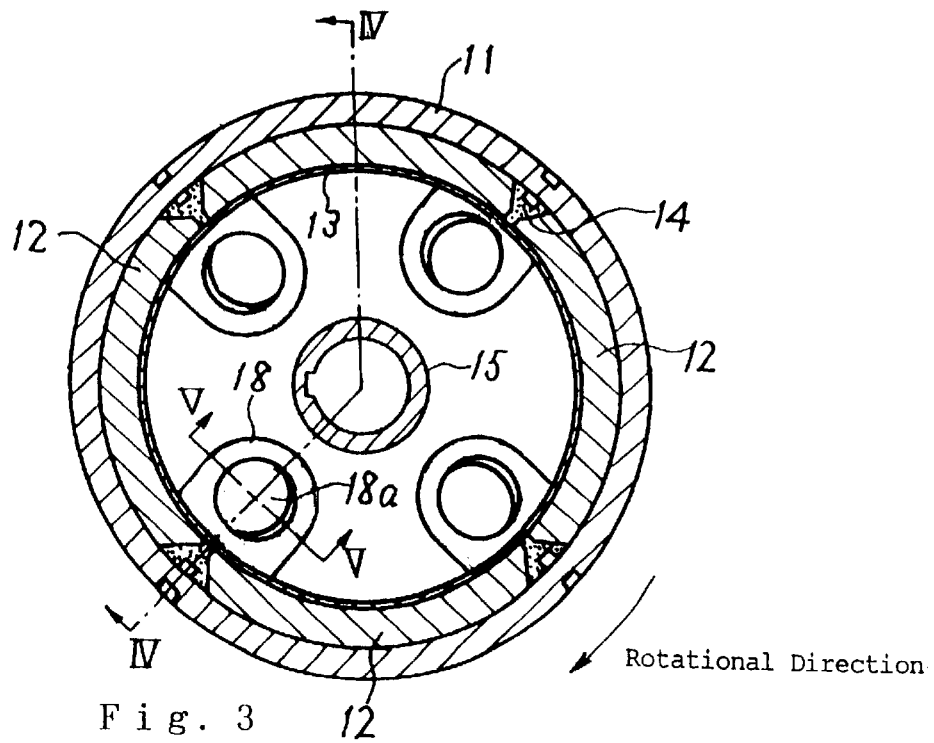
FIG. 3 shows a magneto generator according to Embodiment 2 of the invention, and is a sectional view taken along the line III—III of FIG. 4.
Figure 4:
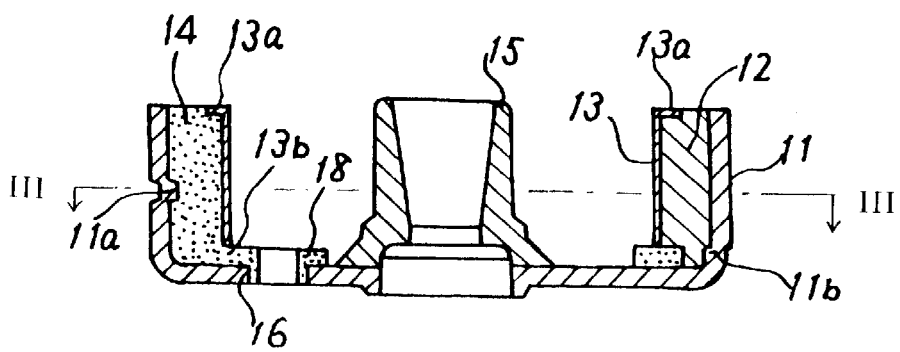
FIG. 4 is a sectional view taken along the line IV—IV of FIG. 3.
Figure 5:
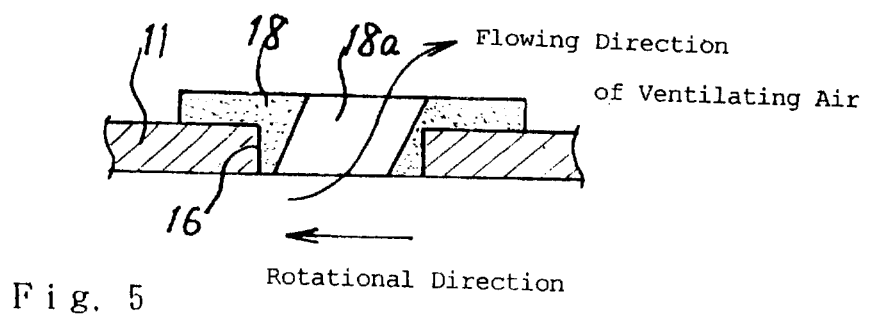
FIG. 5 is a sectional view of an essential part taken along the line V—V of FIG. 3.

FIGS. 3, 4 and 5 show a rotor of a magneto generator according to Embodiment 2 of the invention. FIG. 3 is a sectional view taken along the line III—III of FIG. 4, FIG. 4 is a sectional view taken along the line IV—IV of FIG. 3, and FIG. 5 is a sectional view of an essential part taken along the line V—V of FIG. 3. In this Embodiment 2, plural vent holes 16 are formed on the side wall portion of the flywheel 11, and fins 18 are formed of resin so as to surround the circumference and the inside of the vent holes 16. FIG. 3 shows an example of forming one vent hole 16 at every boundary portion of the magnets 12 near the boundary portion of the neighboring magnets 12 on the side wall portion of the flywheel 11. Other than this example, it is also preferable to form a different number of vent holes 16 at different positions on the side wall portion.

As shown in FIGS. 4 and 5, each of the fins formed so as to surround the circumferences of the vent holes 16 is comprised of a portion located at the circumference of each vent hole 16 on the inner surface of the side wall portion of the flywheel 11, and a portion located inside each vent hole 16. Those fins are formed of a resin. As shown in the sectional view of one vent hole 16 taken along the rotational direction of the flywheel 11 in FIG. 5, a fin 18 is provided with a hole 18a, whose center axis is inclined so as to make an obtuse angle with respect to the rotational direction of rotation in the vent hole 16. By forming such holes 18a, when rotating the flywheel 11, the outside air is forcibly introduced into the inside of the flywheel 11 as shown in FIG. 5. The air heated in the flywheel 11 is discharged through the opening side located at the other end side of the circumferential wall portion of the flywheel 11, and ventilation is performed efficiently. Thus, power generation efficiency is improved.

In the same manner as in Embodiment 1, it is also preferable that the notches 13b are formed on the guard ring 13 side being in contact with the side wall portion of the flywheel 11. In such a construction, configuration of the fin is preliminarily formed on a mold for resin molding for (not shown), whereby at the time of filling with the resin 14, the resin can flow from the notches 13b into the inside and the circumference of the vent holes 16, and the fins 18 can be formed integrally with the vent hole 16 portions at the same time. As a result, any separate process is not necessary to form the fins in the manufacturing process of the rotor, and it is possible to manufacture the magneto generator at a reasonable cost.

Embodiment 3

Figure 6:
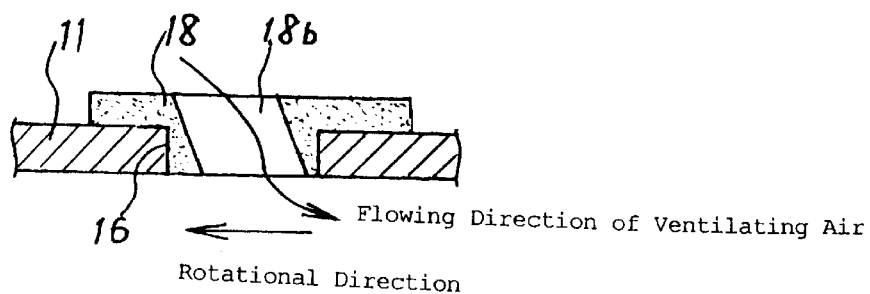
FIG. 6 is a sectional view showing a vent hole of a magneto generator according to Embodiment 3 of the invention.

The foregoing Embodiment 2 shows an example in which the outside air is introduced from the vent holes 16 of the flywheel 11 into the inside of the flywheel 11, and the heated air in the flywheel 11 is discharged from the opening side located at the other end side of the circumferential wall portion of the flywheel 11. On the other hand, in this Embodiment 3, as shown in FIG. 6, a hole 18b is formed on the fin 18 in the vent hole 16 so that its center axis makes an acute angle with respect to the rotational direction of the flywheel 11. Accordingly, when rotating the flywheel 11, the outside air is introduced from the opening side located at the other end side of the circumferential wall portion of the flywheel 11, and the heated air is forcibly discharged from the holes 18b formed on the fins 18 to the outside.

Embodiment 4

Figure 7:
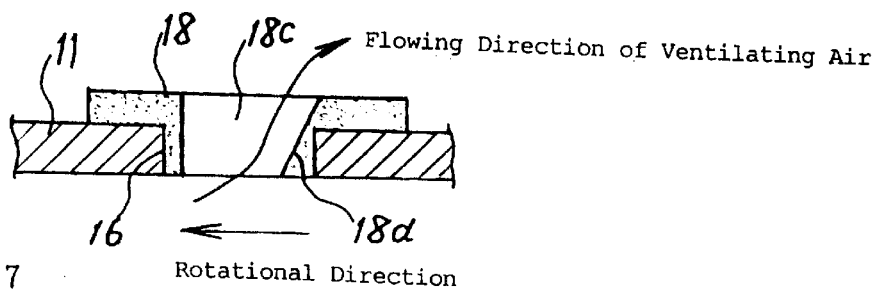
FIG. 7 is a sectional view showing a vent hole of a magneto generator according to Embodiment 4 of the invention.

In the construction in which the outside air is introduced from the vent holes 16 provided with the fins 18 in the same manner as in the foregoing Example 2, as shown in the sectional view of one vent hole 16 taken along the rotational direction of the flywheel 11 in FIG. 7, it is also preferable to form a hole 18c on the fin 18 in the vent hole 16 so that only a backside portion in the rotational direction may have an inclination 18d making an obtuse angle with respect to the rotational direction.

Embodiment 5

Figure 8:
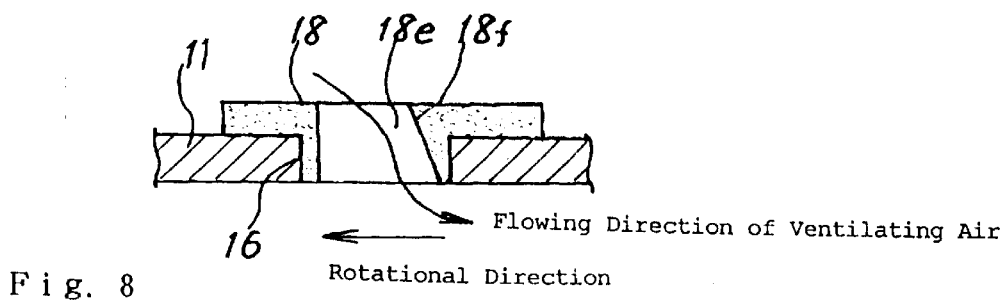
FIG. 8 is a sectional view showing a vent hole of a magneto generator according to Embodiment 5 of the invention.

In the construction in which the heated air inside the flywheel 11 is discharged from the vent holes 16 to the outside in the same manner as in the foregoing Embodiment 3, as shown in the sectional view of the vent holes 16 taken along the rotational direction of the flywheel 11 in FIG. 8, it is also preferable to form a hole 18e on the fin 18 so that only a backside portion in the rotational direction may have an inclination 18f making an acute angle with respect to the rotational direction.

Embodiment 6

Figure 9:
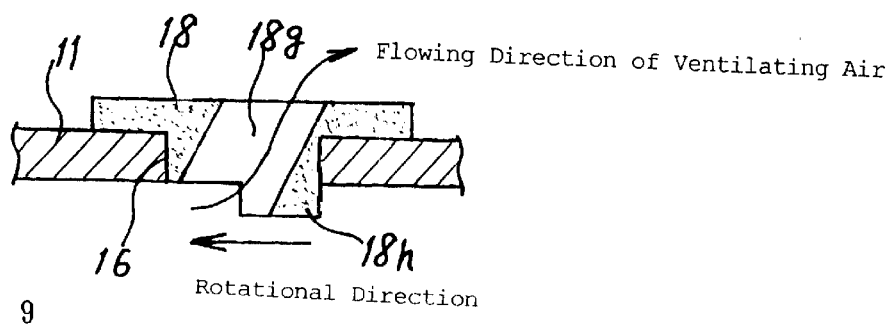
FIG. 9 is a sectional view showing a vent hole of a magneto generator according to Embodiment 6 of the invention.

In the construction in which the outside air is introduced from the vent holes 16 provided with the fins 18 in the same manner as in the foregoing Example 2, as shown in the sectional view of one of the vent holes 16 taken along the rotational direction of the flywheel 11 in FIG. 9, it is also preferable to form a hole 18g on the fin 18 so that the center axis of the hole 18g makes an obtuse angle with respect to the rotational direction and forms a protrusion 18h protruding toward the outside of the flywheel 11 on the backside portion in the rotational direction of the fin 18. As a result, ventilation is performed more effectively.

Embodiment 7

Figure 10:
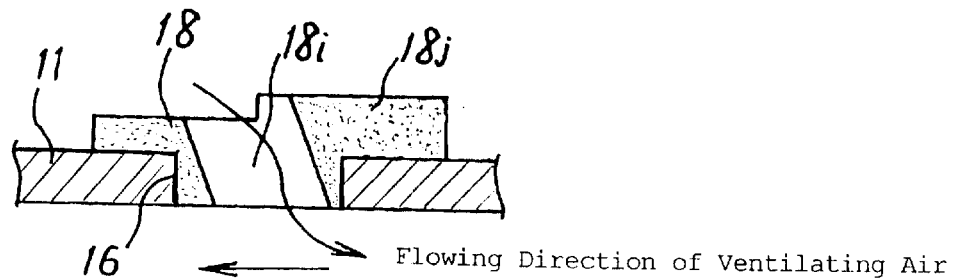
FIG. 10 is a sectional view showing a vent hole of a magneto generator according to Embodiment 7 of the invention.
Figure 11:
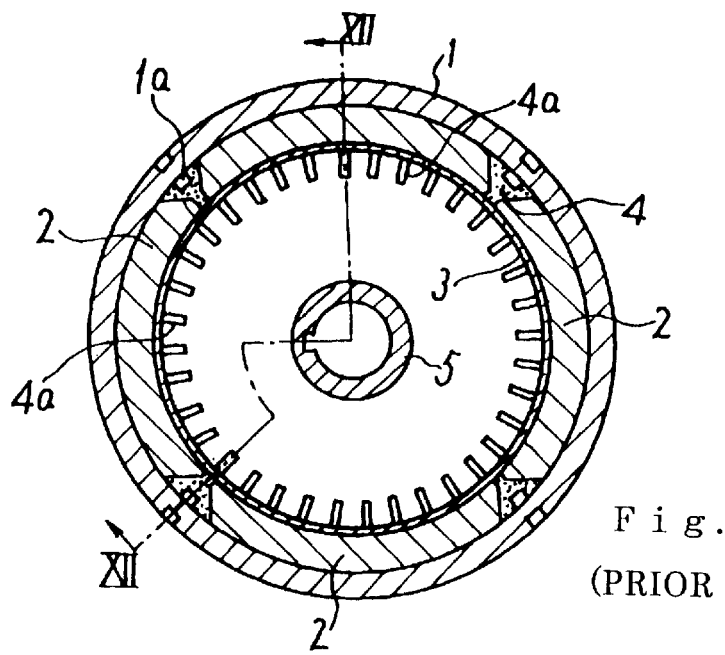
FIG. 11 shows a magneto generator according to the prior art, and is a sectional view taken along the line XI—XI of FIG. 12.
Figure 12:
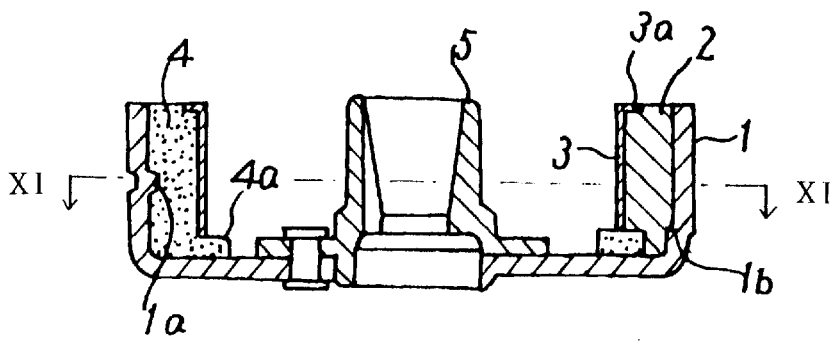
FIG. 12 is a sectional view taken along the line XII—XII of FIG 11.

In the construction in which the heated air inside the flywheel 11 is discharged from the vent holes 16 to the outside in the same manner as in the foregoing Embodiment 3, as shown in the sectional view of one of the vent holes 16 taken along the rotational direction of the flywheel 11 in FIG. 10, it is preferable to form a hole 18i on the fin 18 so that the center axis of the hole 18i makes an acute angle with respect to the rotational direction of the flywheel 11 and, at the same time, form a protrusion like 18j protruding toward the inside of the flywheel 11 on a backside portion in the rotational direction of the fin 18. As a result, ventilation is performed more effectively.

It is to be understood that the invention is not limited to the foregoing embodiments and various changes and modifications may be made without departing from the spirit and scope of the invention.

What is claimed is:

1. A magneto generator comprising:
    a bowl-shaped flywheel formed by a circumferential wall portion and a side wall portion on one end side of said circumferential wall portion;
    plural magnets arranged on an inner peripheral surface of said flywheel; and
    a magneto coil which is arranged in said flywheel so as to oppose to said magnets and generates an electric power utilizing electromagnetic induction between the magneto coil and said magnets;
    in which said flywheel has plural vent holes on the side wall portion and is provided with fins arranged between neighboring two vent holes and protruding toward the inside of said flywheel so that outside air may be introduced in the flywheel or inside air may be discharged therefrom during rotation of said flywheel.

2. The magneto generator according to claim 1, wherein the fins are formed integrally by a resin, said resin filling a space between a cylindrical guard ring arranged on the inside of the plural magnets and the flywheel, and said magnets are embedded in the resin.

3. A magneto generator comprising:
    a bowl-shaped flywheel formed by a circumferential wall portion and a side wall portion on one end side of said circumferential wall portion;
    plural magnets arranged on an inner peripheral surface of said flywheel; and
    a magneto coil which is arranged in said flywheel so as to oppose to said magnets and generates an electric power utilizing electromagnetic induction between the magneto coil and said magnets;
    wherein said flywheel has plural vent holes on the side wall portion and fins are formed so as to surround circumference and inside of the vent holes so that outside air may be introduced in said flywheel or inside air may be discharged therefrom through holes formed on said fins.

4. The magneto generator according to claim 3, wherein the fins are formed integrally by a resin, the mentioned resin filling a space between a cylindrical guard ring arranged on the inside of said magnets and the flywheel, and the magnets are embedded in the resin.

5. The magneto generator according to claim 3, wherein the holes formed on the fins surrounding the inside of the vent holes are open so that center axis of each hole may be inclined with respect to the rotational direction of said flywheel.

6. The magneto generator according to claim 5, wherein the fins surrounding the circumferences of the vent holes are arranged so that backside portion of the flywheel in the rotational direction may protrude toward inside or outside of said flywheel.

7. The magneto generator according to claim 3, wherein the holes formed on the fins surrounding the inside of the vent holes are open so that backside portions in the rotational direction of the flywheel may be inclined with respect to the rotational direction.

8. The magneto generator according to claim 7, wherein the fins surrounding the circumferences of the vent holes are arranged so that backside portion of the flywheel in the rotational direction may protrude toward inside or outside of said flywheel.

* * * * *